(12) United States Patent
Bulharowski (10) Patent No.: US 6,806,592 B2
(45) Date of Patent: Oct. 19, 2004

(54) WAVEFORM CONTROLLER OSCILLATOR PROGRAM FOR AN AIRCRAFT COUNTERMEASURE SYSTEM

(75) Inventor: Thomas F. Bulharowski, Port Hueneme, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 44 days.

(21) Appl. No.: 10/384,926

(22) Filed: Mar. 4, 2003

(65) Prior Publication Data
US 2004/0174075 A1 Sep. 9, 2004

(51) Int. Cl.⁷ .................................................. G01S 7/36
(52) U.S. Cl. .......................................... 307/149; 342/14
(58) Field of Search ............................ 307/149; 342/14, 342/15

(56) References Cited

U.S. PATENT DOCUMENTS 5,560,567 A * 10/1996 Hallmark ................... 244/3.14

* cited by examiner

Primary Examiner—Shawn Riley
(74) Attorney, Agent, or Firm—David S. Kalmbaugh (57) ABSTRACT

A computer software program which functions as the operating system software for a electronic countermeasure set. The software allows a pilot in an aircraft to generate multiple ECM modes from a console in the aircraft. The counter software program also allows a user to reprogram the ECM modes in a laboratory environment.

21 Claims, 12 Drawing Sheets

WAVEFORM CONTROLLER OSCILLATOR PROGRAM FOR AN AIRCRAFT COUNTERMEASURE SYSTEM

BACKGROUND OF THE INVENTION

1. Field of the Invention

The present invention relates generally to countermeasures systems used onboard an aircraft. More particularly, the present invention relates to a computer software program for an aircraft/ground based countermeasure system which controls the operation of the waveform controller oscillator (WCO) for the countermeasure system.

2. Description of the Prior Art

The AN/ULQ-21s countermeasure set is a programmable EA (electronic attack) set which generates multiple ECM modes of operation and combinations of these modes. Further, the AN/ULQ-21s is digital, computer controlled countermeasure set which is user programmed and which operates generally in the 1 to 18 GHZ with unique capabilities in Ka-Band of 36 GHz.

The AN/ULQ-21s countermeasure set has a waveform controller oscillator (WCO) which functions as the operating system for the AN/ULQ-21s countermeasure set controlling up to three modules of the system simultaneously.

Early version of the AN/ULQ-21s provided for segmented analog control of the countermeasure set. Analog control severely limited the jammer techniques or jammer modes that could be implemented using the AN/ULQ-21s countermeasure set. However, there was a need for a computer program which provided digital control and an interface with the various software controlled components/ modules of the AN/ULQ-21s countermeasure set and will also allow for expansion of the countermeasure set's when additional modules are developed for the AN/ULQ-21s countermeasure set.

SUMMARY OF THE INVENTION

The present invention overcomes the disadvantages of the past including those mentioned above in that it comprises a highly effective and comprehensive computer software program which is the operating system software for waveform controller oscillator (WCO) of the AN/ULQ-21s countermeasure set. The computer software program comprising the present invention allows a pilot on board an aircraft to initiate any one of the fifteen electronic attack modes of operation for the AN/ULQ-21s countermeasure set from a cockpit control console.

When the AN/ULQ-21S countermeasure set is deployed in a laboratory environment a user can reprogram the fifteen electronic countermeasure modes of operation for the AN/ULQ-21s countermeasure set using a keyboard and monitor connected to the waveform controller oscillator. The software also allows a user to test the AN/ULQ-21s countermeasure set after reprogramming the countermeasure set.

The software includes a utility menu which allows the user to configure the countermeasure set parameters to provide for a variety of ECM techniques including noise, and other types of deception by providing false information (range, angle or velocity) to a threat missile, aircraft or other weapons system.

The software also allows for read/write access to the waveform controller oscillator's memory, the initialization of the waveform controller oscillator's EEPROM, and the initialization of the fifteen ECM modes of operation for the AN/ULQ-21s countermeasure set.

DETAILED DESCRIPTION OF A PREFERRED EMBODIMENT

Figure 1:
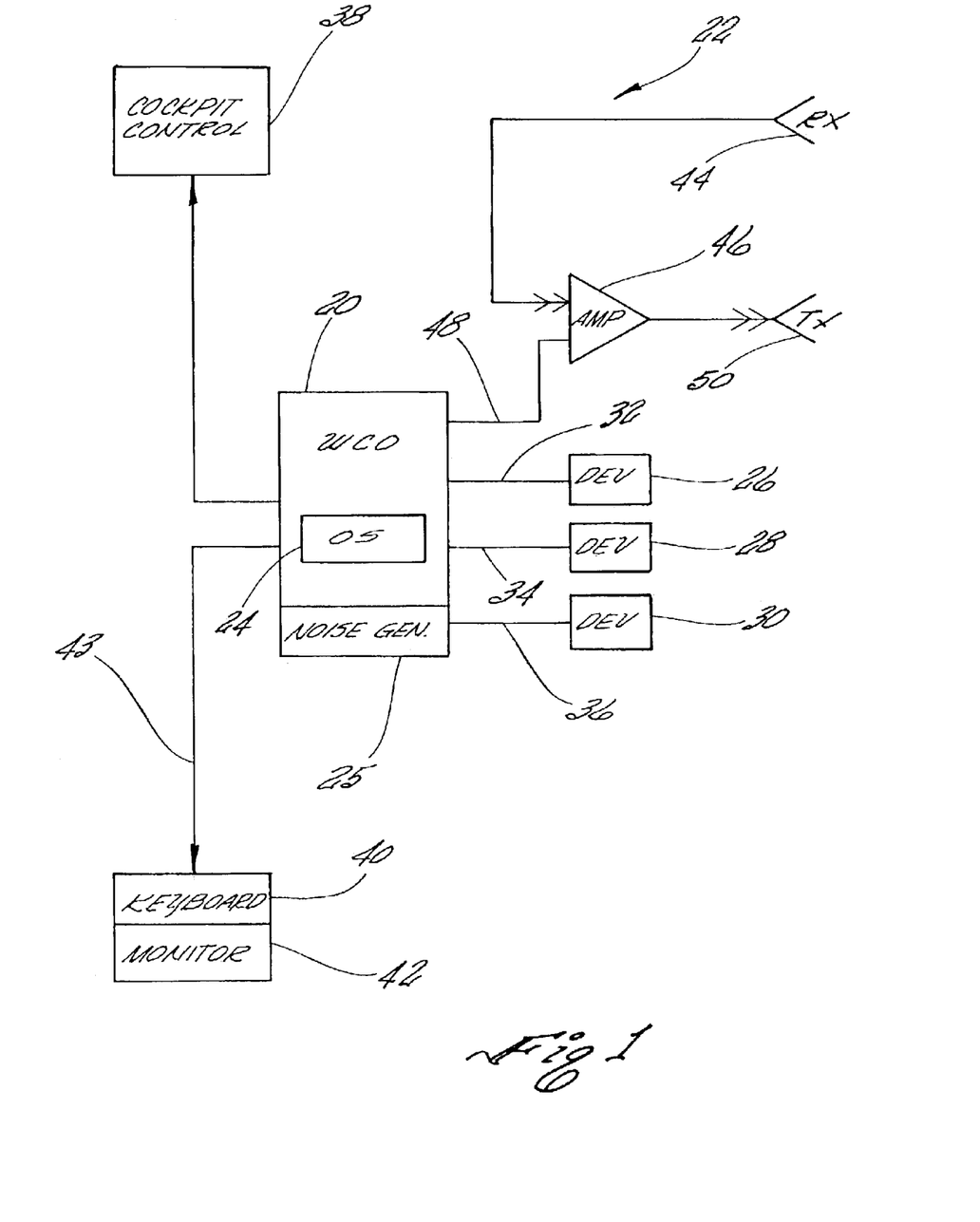
FIG. 1 is a simplified block diagram depicting the waveform controller oscillator for the AN/ULQ-21s countermeasure set interfaced with various modules of the countermeasure set.

Referring to FIG. 1, there is shown a block diagram of the waveform controller oscillator, designated generally by the reference numeral 20, which operates as the controller for the AN/ULQ-21s countermeasure set 22. Included in the waveform controller oscillator 20 is the operating system software 24 which has its flow chart depicted in FIGS. 2–11. Waveform controller oscillator 20 has three modules/devices 26, 28 and 30 connected thereto via its three communications ports 32, 34 and 36. The devices 26, 28 and 30 may include, for example, an instantaneous frequency measurement (IFM) device, a G/I band memory modulator (GI_MM), an E/F band memory modulator (EF_MM), a target generator or a multiple target deception amplifier (MTDA). The device 30 may also include an E/F-band variable polarization attenuator control (EF_VPAC) device or a B-band variable polarization attenuator control (B_VPAC) device.

An aircraft cockpit control console 38 is also connected to waveform controller oscillator 20. Cockpit control console 38 allows a pilot aboard an aircraft to input electronic countermeasure (ECM) commands into the waveform controller oscillator 20 when the waveform controller oscillator 20 is deployed on board the aircraft.

When the waveform controller oscillator 20 is in a laboratory environment a keyboard 40 and monitor 42 comprising a computer terminal can be connected to waveform controller oscillator 20 allowing a user to reprogram the functions of oscillator 20.

The devices 26, 28 and 30 may comprise noise generators which operate as an adjustable microwave noise source; and a multiple target deception amplifier (MTDA) which provides for deception and amplitude modulation techniques. These modules along with other modules developed for the AN/ULQ-21s countermeasure set 22 allow the countermeasure set 22 to provide false information (range, angle, and or velocity) to an enemy weapons system, such as a missile or aircraft in order to break of break the missile or weapons system tracking capabilities.

There is also a receiving antenna 44 which has its output connected to the first input of an amplifier 46. A command/signal line 48 from waveform controller oscillator 20 is connected to the control/signal input of amplifier 46. The output of amplifier 46 is connected to the transmitting antenna 50 for the AN/ULQ-21s countermeasure set 22.

The amplifier for wave form controller oscillator 20 is a traveling wave tube amplifier which provides the high power amplification of the electronic countermeasure signal before transmission of the ECM signal by the transmitting antenna 50 for the AN/ULQ-21s countermeasure set 22. The transmitted ECM signal (also an RF signal) is in response to the RF signal received by the receiving antenna 44 from an incoming missile or weapons system.

Figure 2:
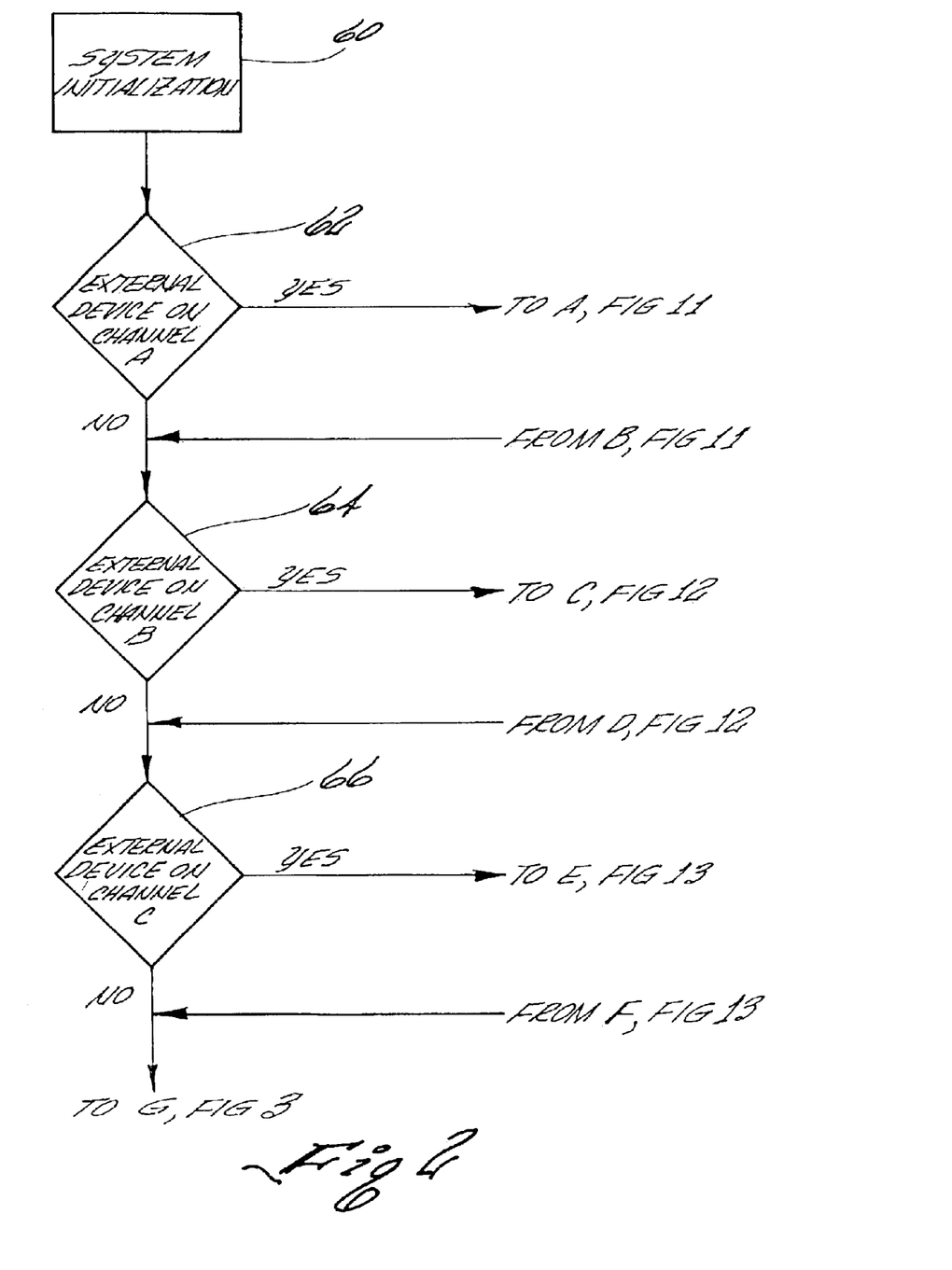
FIGS. 2–12 and 13 depict a flow chart for the computer software program which controls the operation of the waveform controller oscillator for the AN/ULQ-21s countermeasure set.

Referring now to FIGS. 1 and 2, the operating system software 24 for waveform controller oscillator 20 performs a system initialization (initialize counters, etc.) during program step 60. During program steps 62, 64 and 66, the software checks the three communications ports 32, 34 and 36 to determine if there are devices 26, 28 and 30 on the communications ports. For example, there may be a device such as an instantaneous frequency measurement device on communications port 32. If there is a device 26 on this communications port (identified in the flow chart as channel A) than the software will proceed to the program steps set forth in FIG. 11.

Whenever a device is not connected to communications port 32, the software proceeds directly to program step 64 to determine if there is a device 28 on communications port 34 (identified in the flow chart as channel B). When there is a device 28 on communications port 34 the software will proceed to the program steps set forth in FIG. 12.

Figure 13:
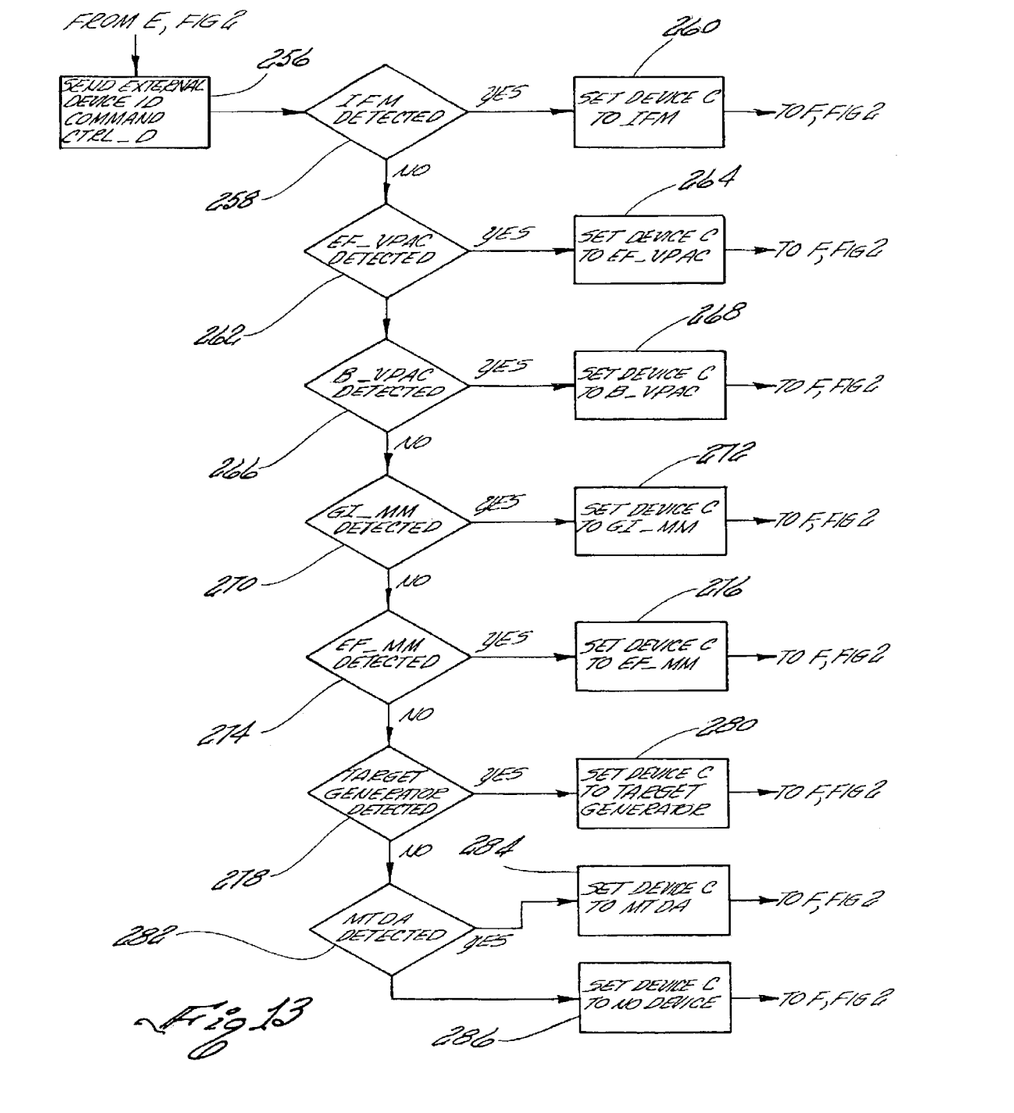

Whenever a device is not connected to communications port 34, the software proceeds directly to program step 66 to determine if there is a device 30 on communications port 36 (identified in the flow chart as channel B). When there is a device 30 on communications port 36 the software will proceed to the program steps set forth in FIG. 13. Essentially, the program steps 62–66 of FIG. 2 are determine the system configuration for the AN/ULQ-21s countermeasure set 22.

Referring to FIGS. 1, 2, 11, 12 and 13, when the waveform controller oscillator 20 sends a Ctrl-D command to each communications port 32, 34 and 36 which is an external device command. This occurs during program step 208 for communications port 32 (channel A); program step 232 for communications port 34 (channel B); and program step 256 for communications port 36 (channel C). The device on the communications port responds with its identification.

Figure 11:
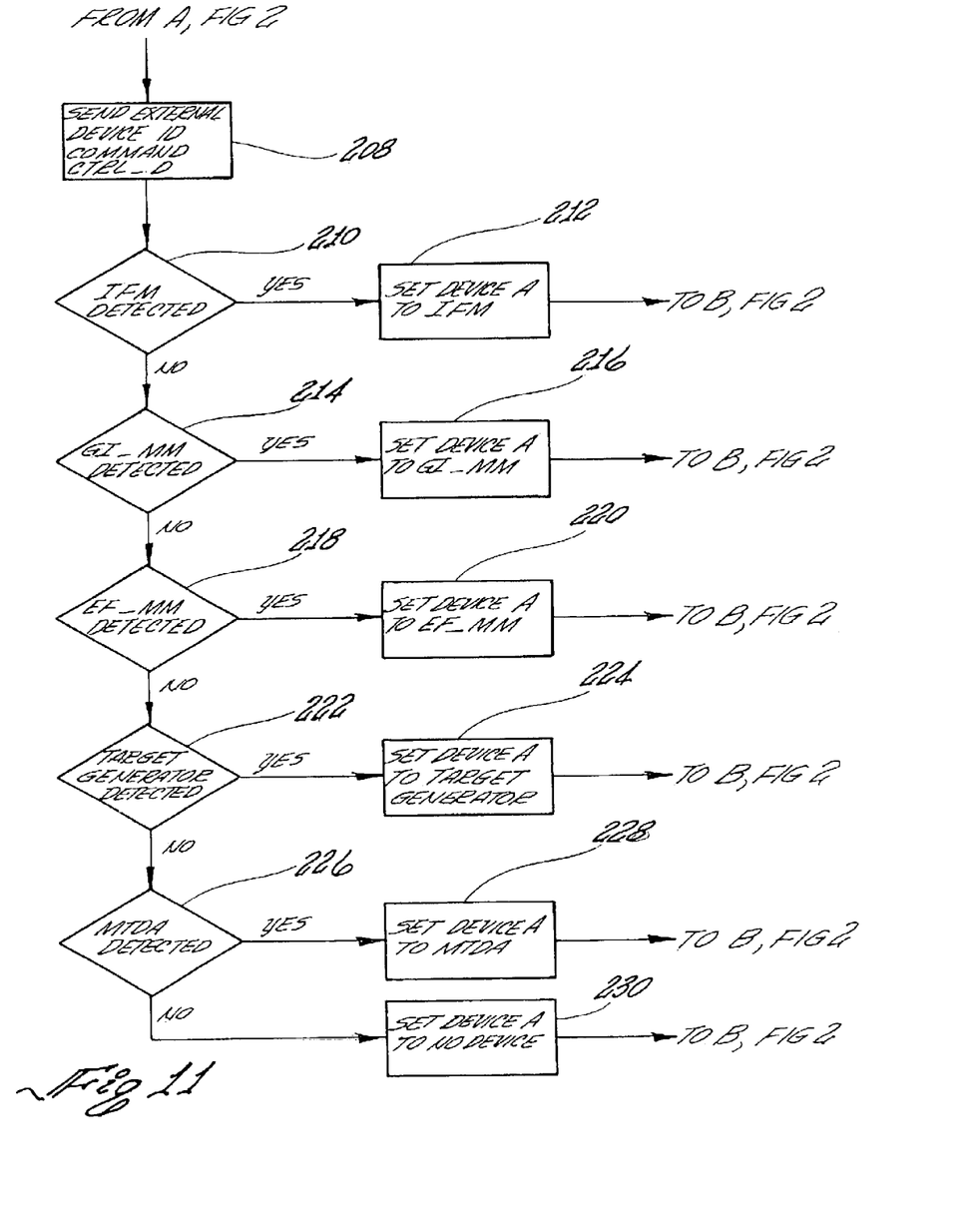

For example, when an IFM device is detected on communications port 32 (program step 210), the IFM device transfers its identification code to the waveform controller oscillator 20 (program step 212). Similarly, when a target generator is detected on communications port 32 (program step 222), the target generator will send its identification code to the waveform controller oscillator 20 (program step 224). When a GI_MM device is detected (program step 214) on communications port 32, the GI_MM device will send its ID to the waveform controller oscillator 20 (program step 216). When a EF_MM device is detected (program step 218) on communications port 32, the GI_MM device will send its ID to the waveform controller oscillator 20 (program step 220). When a MTDA device is detected (program step 226) on communications port 32, the GI_MM device will send its ID to the waveform controller oscillator 20 (program step 228). Program step 230 sets device A (device 26) to no device meaning that a device or module has not been detected on communications port 32.

Figure 12:
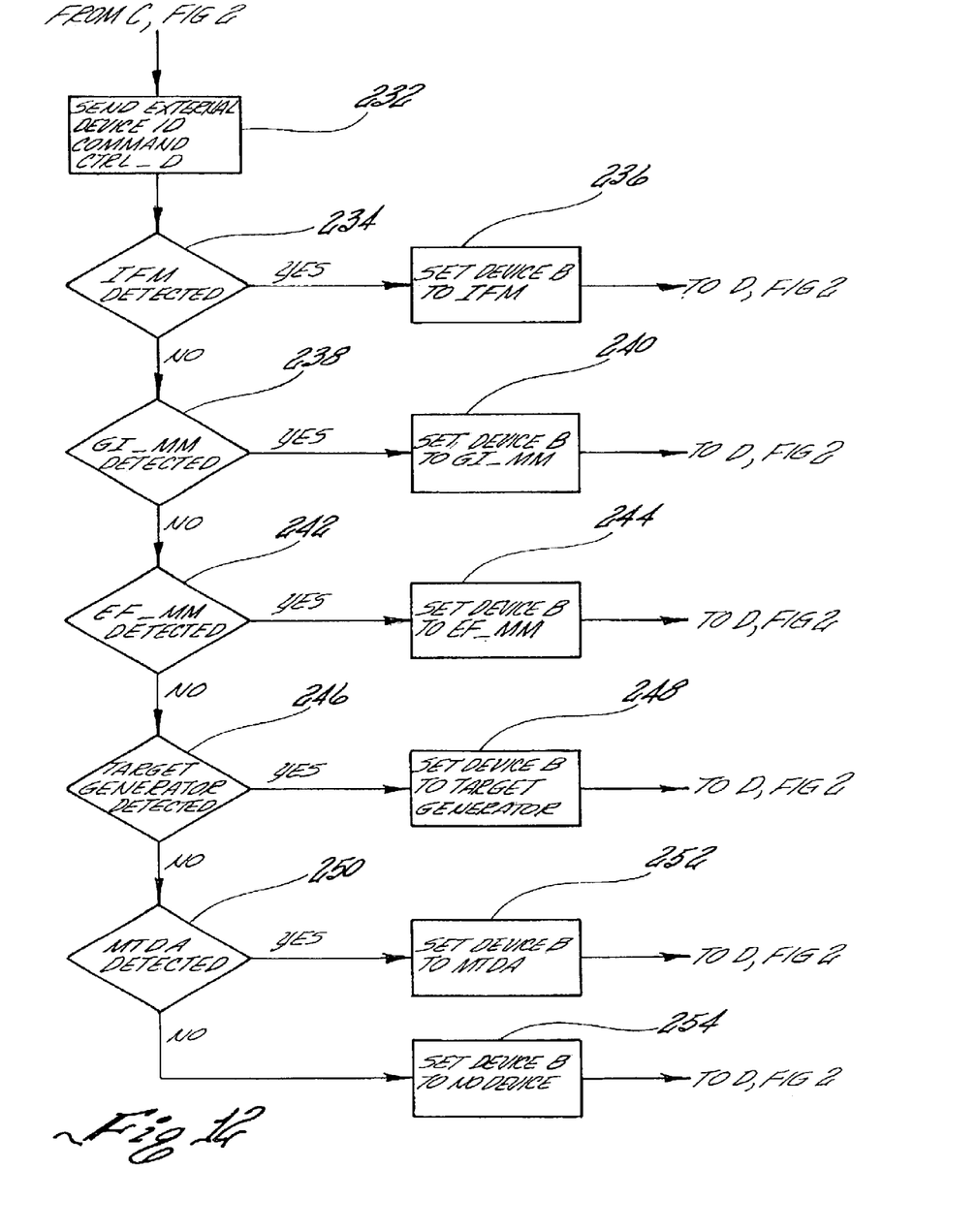

Program steps 234–254 of FIG. 12 for detecting modules on communications port 34 are identical to program steps 210–230 of FIG. 11. Program steps 258, 260 and 270–286 of FIG. 13 for detecting modules on communications port 36 are also identical to program steps 210–230 of FIG. 11. The software for waveform controller oscillator 20 also allows for detecting the presence of a EF_VPAC device on communications port 36 (program steps 262 and 264) and for detecting the presence of a B_VPAC device on communications port 36 (program steps 266 and 268).

Figure 3:
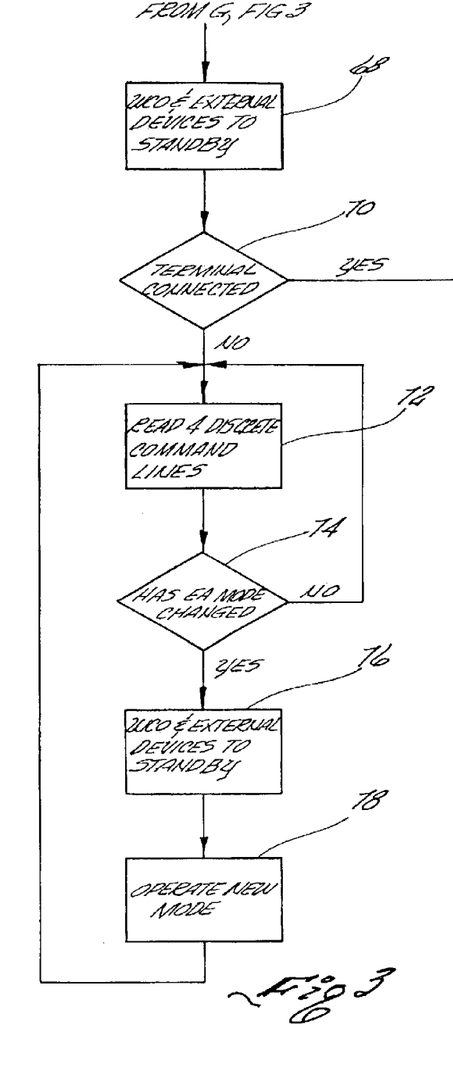

Referring to FIGS. 1 and 3, program step 68 of the software for waveform controller oscillator 20 places waveform controller oscillator 20 and devices 26, 28 and 30 in a standby state and then the software proceeds to program step 70. During program step 70 the software checks for the presence of a keyboard 40 and a monitor 42 which are connected to waveform controller oscillator 20 via a computer terminal line/cable 43. The keyboard 40 and monitor 42 are used in a laboratory environment for reprogramming waveform controller oscillator 20.

If keyboard 40 and monitor 42 are not present then the software proceeds to program step 72, the cockpit command is read from the pilot's cockpit control console 38. The cockpit command defines an ECM mode of operation provided by the pilot when the AN/ULQ-21s is used on board an aircraft. The aircraft may be, for example, an F/A-18 aircraft. There are up to fifteen ECM modes of operation for the AN/ULQ-21s countermeasure set 22 and a standby mode which is mode zero. Mode 1 may be a velocity deception mode by which an enemy weapons system tracking the aircraft detects the velocity with a 200 knot error (the velocity sensed by the enemy missile is in error by 200 knots), mode 2 may be a velocity deception mode by which an enemy weapons system tracking the aircraft detects the velocity with a 300 knot error, and mode 3 may be a velocity deception mode by which the enemy weapons system tracking the aircraft detects the velocity with a 100 knot error. Program step 74 determines whether a mode change has occurred with the monitoring cycle being approximately every 100 milliseconds. When a change in the mode of ECM operation occurs the software proceeds to program step 76 and again places waveform controller oscillator 20 and devices 26, 28 and 30 in a standby state. During program step 76 the modules of AN/ULQ-21s countermeasure set 22 are reconfigured for the new mode of operation and program step 78 begins the new mode of operation of AN/ULQ-21s countermeasure set 22.

Figure 4:
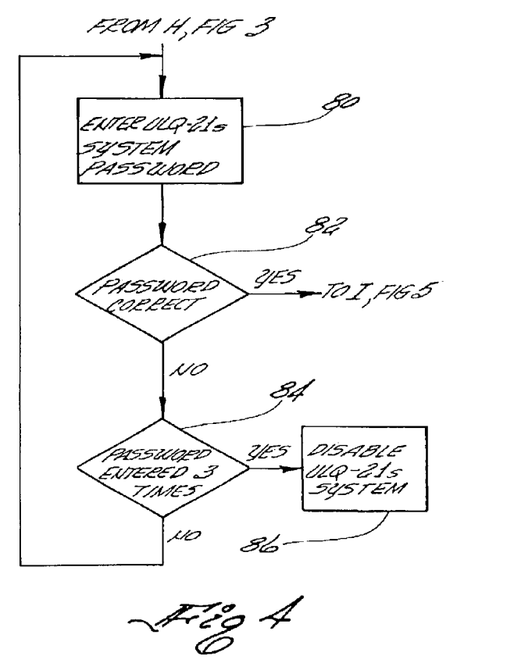

Referring to FIGS. 1 and 4, the password is entered (program step 80) via keyboard 40 and also appears on monitor 42. The password is required whenever keyboard 40 is connected to waveform controller oscillator 20. Failure to enter the password correctly after three attempts locks the user out by disabling AN/ULQ-21s countermeasure set 22 (program steps 84 and 86). When the correct password is entered, the software proceeds to program step 88 (FIG. 5).

Figure 5:
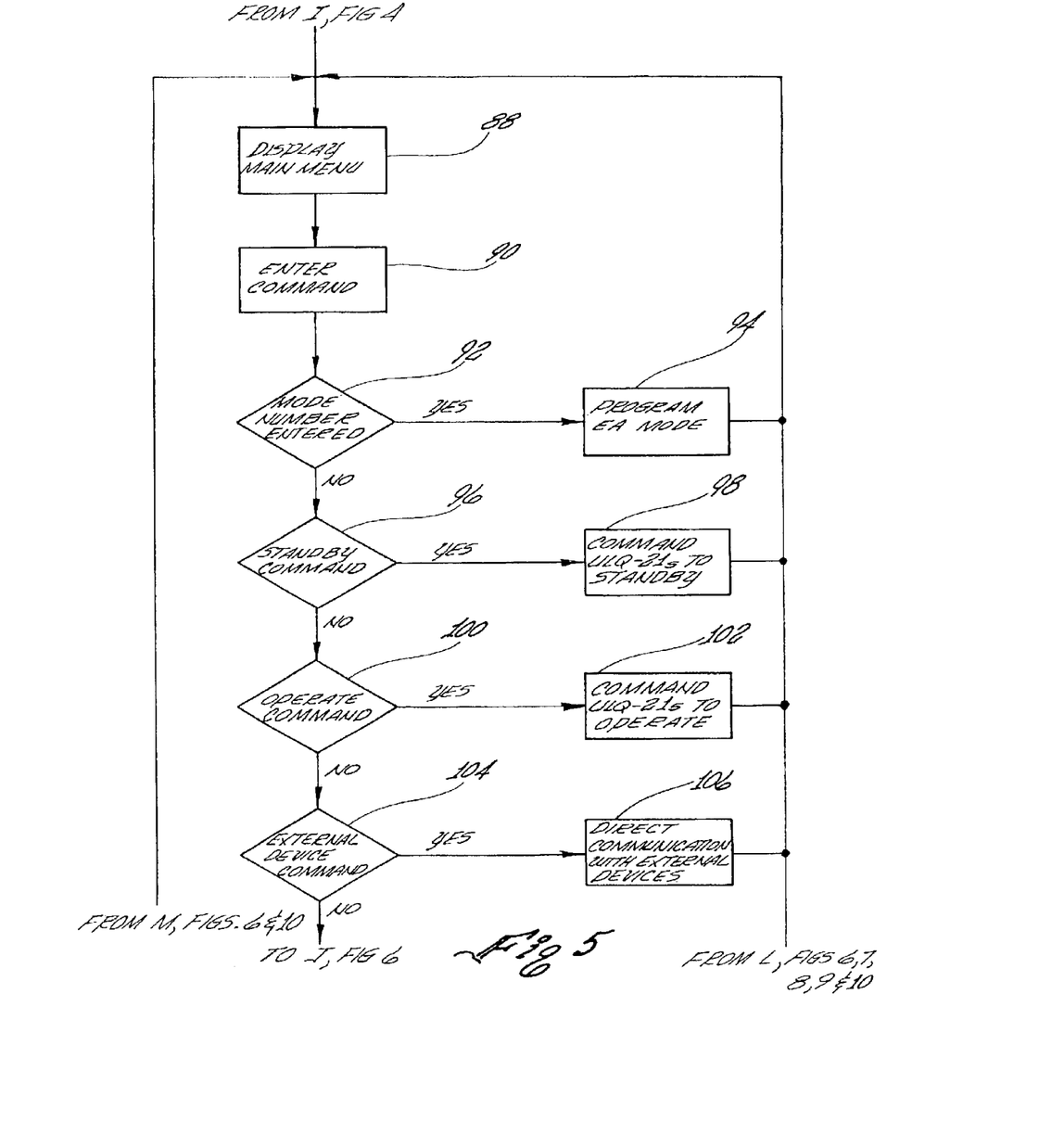
Figure 6:
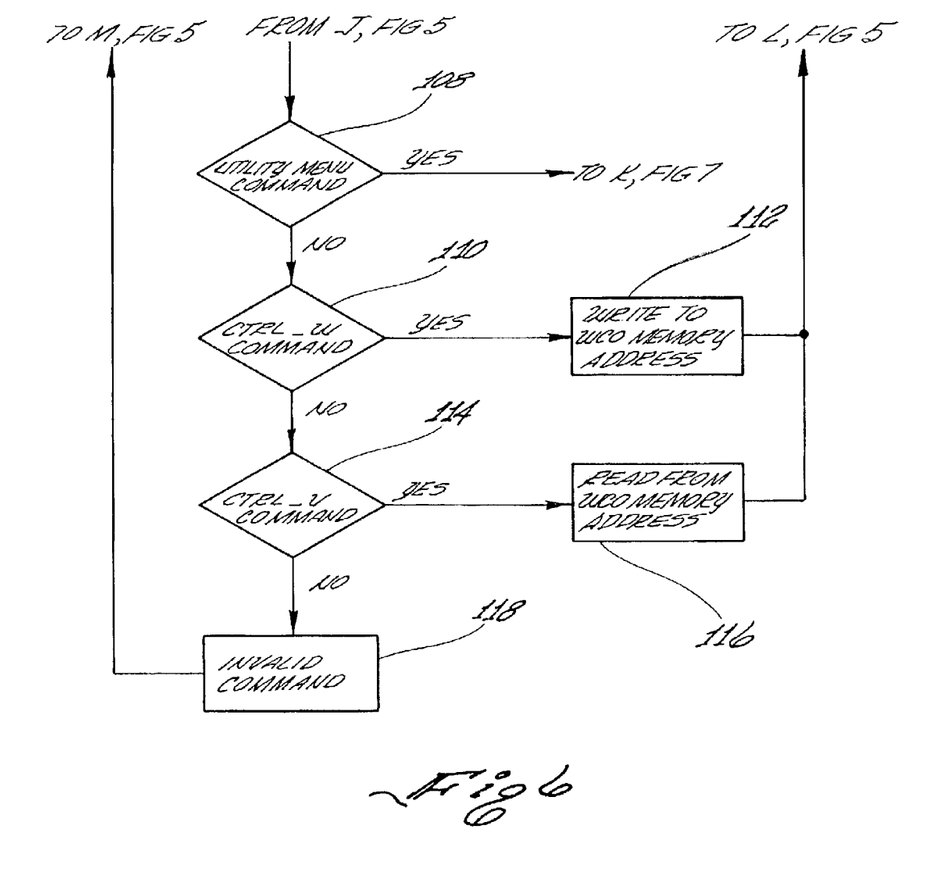

Referring now to FIGS. 1, 5 and 6, the main menu is displayed on monitor 42 (program step 88), a command is entered (program step 90), a mode number is entered (program step 92) and then the EA mode is reprogrammed (program step 94).

Whenever a mode number is not entered by a user, the operating system software 24 for waveform controller oscillator 20 proceeds to one of the commands set forth in program steps 96, 100 and 104 of FIG. 5 and program steps 108, 110 and 114 of FIG. 6.

Program step 94 allows a user to reprogram the mode number the user enters via keyboard 40 during program step 92. For example, if mode 1 provides for an aircraft deception velocity of 300 knots and the user needs to change the aircraft deception velocity to 500 knots, the user can implement this change during program step 94.

Program steps 96 and 98 place the waveform controller oscillator 20 and the three modules/devices 26, 28 and 30 in the standby mode. Keyboard 40 is used by the user to enter the Standby Command during program step 90.

The Operate Command (program step 102) allows the user to test in a laboratory environment the change the user made to a mode of operation during program 94. For example, when the user changed the aircraft deception velocity to 500 knots, the testing of this change occurs during program steps 102 when operating system software 24 for the AN/ULQ-21s countermeasure set 22 directs the countermeasure set 22 to enter its normal operation mode.

During a laboratory simulation, the user feeds an RF signal into the RF signal port for receiving antenna 44 with signal being provided to amplifier 46. The amplifier 48 also receives RF signals which includes ECM mode data from waveform controller oscillator 20. Amplifier 46 then provides an amplified RF signal which includes the ECM mode data to a transmitting antenna 50. The transmitter antenna 50 transmits the amplified RF signal including the ECM mode data to laboratory equipment which performs an analyses the ECM mode data. This analysis is used to assess the performance of the AN/ULQ-21s countermeasure set 22 against a threat missile or other hostile weapons system. For the example, discussed previously, the user is able to determine if the threat missile or other hostile weapons system is reading a speed of 500 knots and thus the effectiveness of the AN/ULQ-21s countermeasure set 22 in deceiving the threat missile or other hostile weapons system.

The External Device Command (program step 104) allows a user to communicate directly with the external devices 26, 28 and 30 connected to waveform controller oscillator 20 (program step 106).

Figure 7:
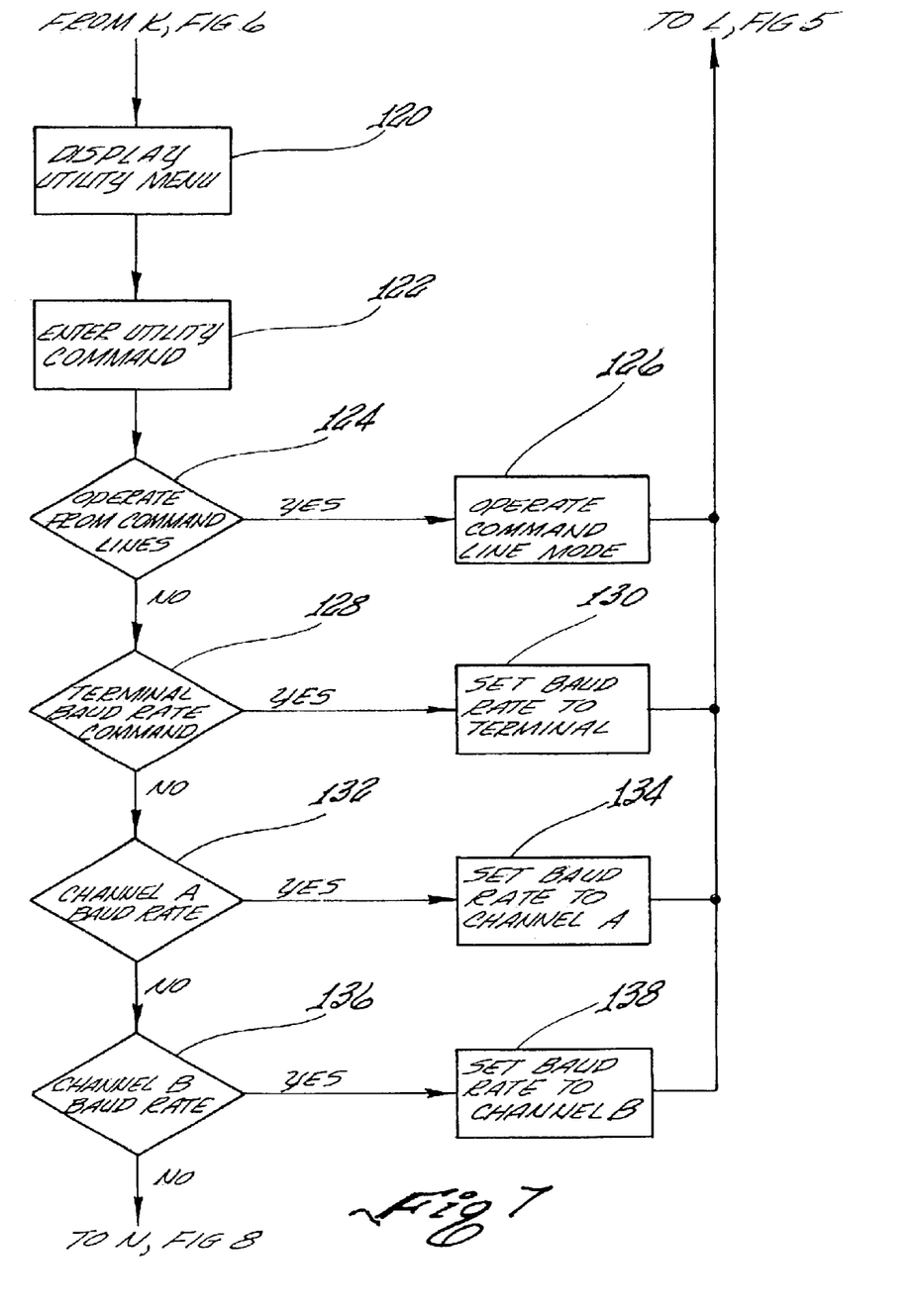
Figure 8:
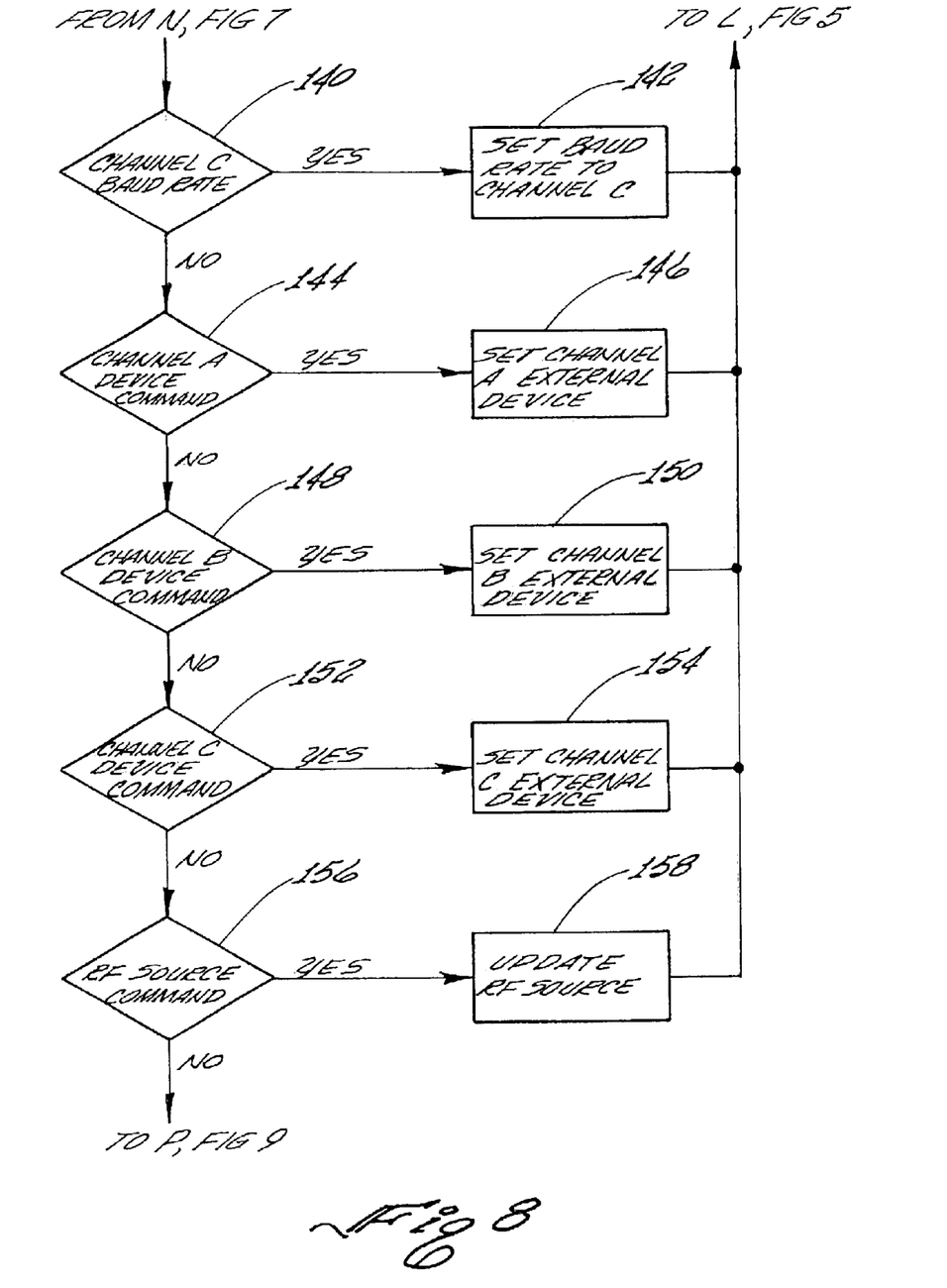
Figure 9:
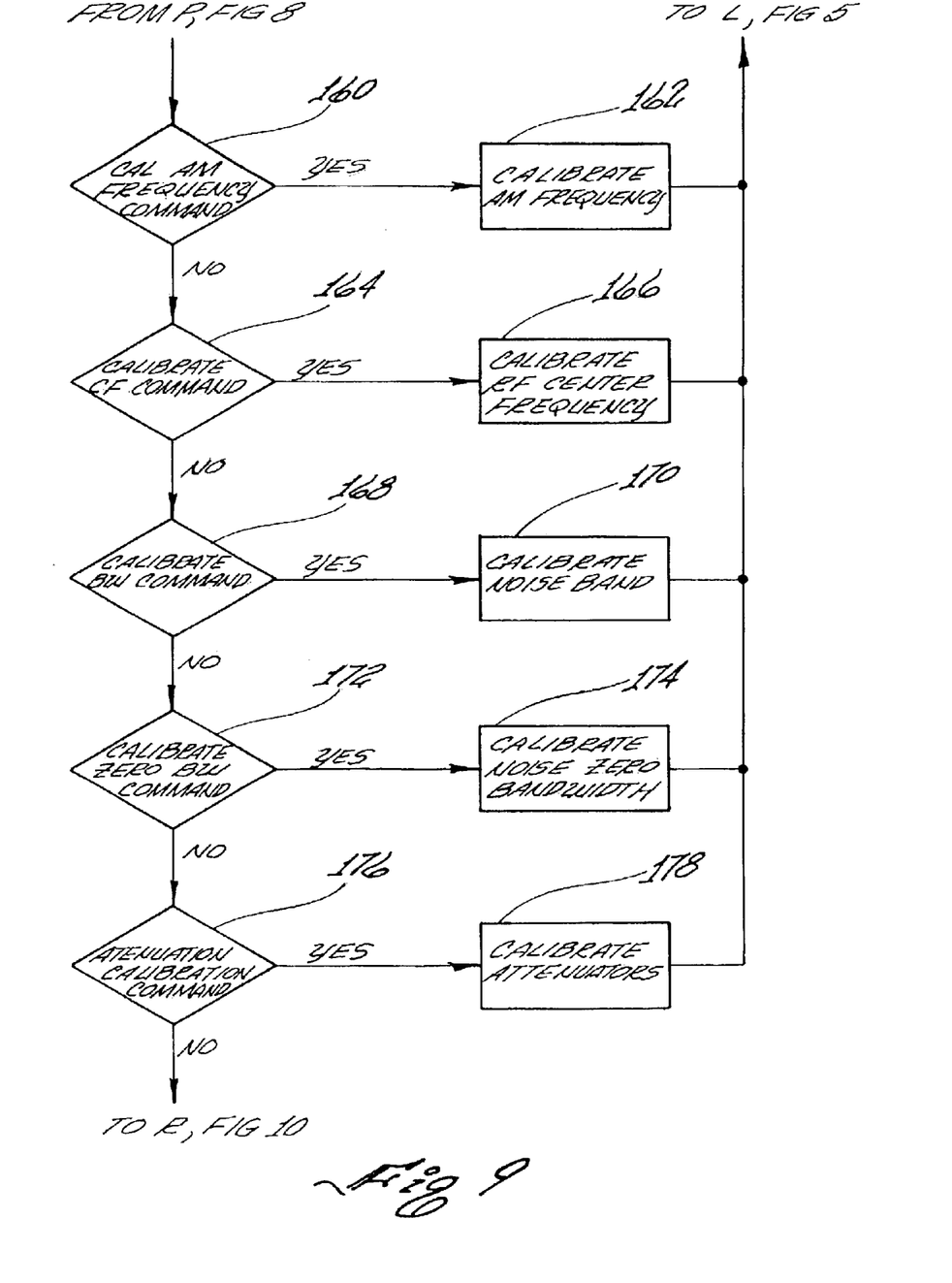

Program step 108 allows a user to access a utility menu for the AN/ULQ-21s countermeasure set 22 which is depicted in FIGS. 7, 8 and 9 by entering the Utility Command using key board 40 (program step 90).

Referring to FIGS. 1, 7 and 8, when the user enters the Utility Command, the user sets the Baud rates for communications port 32 (program step 134), communications port 34 (program step 138) and communications port 36 (program step 142) which allows for communications with devices 26, 28 and 30. Program step 130 sets the baud rate to the keyboard 40 and the monitor 42.

Program step 126 allows to user to operate the AN/ULQ-21s countermeasure set 22 from the cockpit control console 38 Program step 146 allows the user to set device 26 to a module other than the module detected by waveform controller oscillator 20 when the AN/ULQ-21s countermeasure set 22 boots up. For example, device 26 may be an instantaneous frequency measurement (IFM) device connected to communications port 32, but the user may want to have a G/I band memory modulator (GI_MM) connected to communications port 32 to test certain software subroutines associated with the GI_MM. Program step 150 allows the user to set or change the module connected to communications port 34 and program step 154 allows the user to set or change the module connected to communications port 36. As with program step 146 the module detected when the AN/ULQ-21s countermeasure set boots up is not the module which the software currently recognizes as being connected to the communications port.

The AN/ULQ-21s countermeasure set includes a noise generator 25 which is an adjustable noise source. A voltage controlled oscillator in noise generator 25 determines the frequency band in which noise generator 25 operates. The noise generator 25 can operate in frequency bands from 1 to 18 GHz. Program step 158 allows a user to change the frequency band for the voltage controlled oscillator of noise generator 25. The specific frequency at which the noise generator 25 operates is set during program step 94 which is the reprogramming step for the fifteen ECM modes of operation of the AN/ULQ-21s countermeasure set 22. For example, the specific frequency of operation for noise generator 25 may be 9.923 GHz and this frequency is set during program step 94.

Referring to FIGS. 1, 5 and 9, program steps 160, 164, 168, 172 and 176 are for calibration command functions. When, for example, the user desires to calibrate the amplitude modulation frequency for multiple jammer types for the AN/ULQ-21s countermeasure set 22, the Cal AM Frequency Command (program step 160) is entered using keyboard 40 with the amplitude modulation frequency being calibrated during program step 162.

The RF center frequency for noise generated by noise generator 25 of AN/ULQ-21s countermeasure set 22 is calibrated during program step 166 and the noise bandwidth is calibrated during program step 170.

Program step 174 allows for a bandwidth offset when a digital zero is provided to noise generator 25 since noise will occur at zero. Program steps 164-174 are used to calibrate the parameters for noise generator 25.

When, for example, the user desires to calibrate a 20 dB attenuation for multiple jammer types for the AN/ULQ-21s countermeasure set 22, the Attenuation Calibration Command (program step 176) is entered using keyboard 40 with the 20 dB attenuation being calibrated during program step 162.

Figure 10:
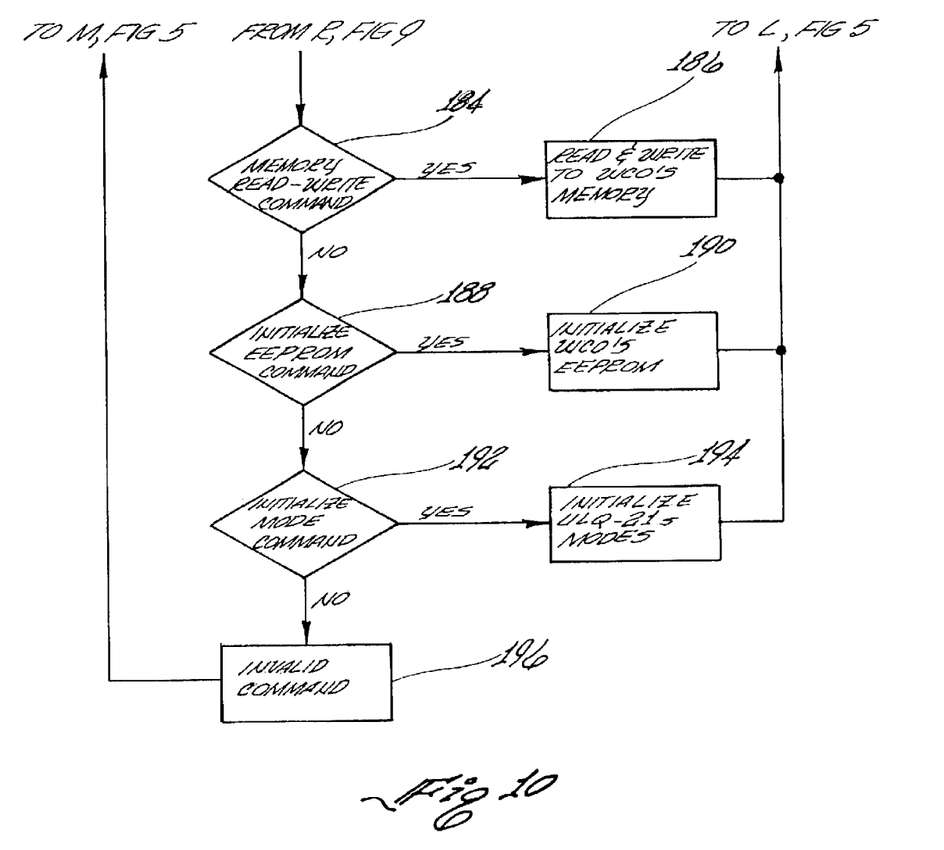

Program step 186 allows a user to read from and write to the waveform controller oscillator's memory, and program step 18 allows a user to initialize an EEPROM within the waveform controller oscillator 20

Program step 190 is used to initialize the ECM modes for the AN/ULQ-21s countermeasure set 22. Program steps 190 and 194 insure that the EEPROM and the ECM modes are set to known values. This may, for example, be necessary when the operating system software is first loaded into the AN/ULQ-21s countermeasure set 22 since the calibration tables may contain erroneous data. Also, when a memory card is replaced within the AN/ULQ-21s countermeasure set 22 there is a need to initialize the system including the EEPROM to a known value.

Referring to FIGS. 1 and 6, when the user enters the CTRL_W command via keyboard 40 (program step 110), program step 112 allows a user to write to a memory address within the waveform controller oscillator's memory. In a like manner, when a user enters the CTRL_V command via keyboard 40 (program step 114), program step 116 allows a user to read from a memory address within the waveform controller oscillator's memory. It should be noted that program step 186 in the utility menu of FIG. 10 preforms the same function as program steps 112 and 116.

From the foregoing it may readily be seen that the present invention comprises a new, unique and exceedingly useful waveform controller oscillator program for an aircraft countermeasure system which constitutes a considerable improvement over the known prior art. Obviously, many modifications of the present invention are possible in light of the above teachings. It is therefore to be understood that within the scope of the appended claims that the invention may be practiced otherwise than as specifically described.

What is claimed is:

1. An operating system computer program for operating a waveform controller oscillator having first, second and third communications ports, comprising:

(a) first detecting means for detecting when a first electronic device is connected to the first communications port for said waveform controller oscillator;

(b) second detecting means for detecting when a second electronic device is connected to the second communications port for said waveform controller oscillator;

(c) third detecting means for detecting when a third electronic device is connected to the third communications port for said waveform controller oscillator;

(d) first electronic countermeasure (ECM) identification means for providing a first CTRL-D command to said first electronic device, said first electronic device in response to said first CTRL-D command providing a first ECM identification code to said waveform controller oscillator;

(e) second ECM identification means for providing a second CTRL-D command to said second electronic device, said second electronic device in response to said second CTRL-D command providing a second ECM identification code to said waveform controller oscillator;

(f) third ECM identification means for providing a third CTRL-D command to said third electronic device, said third electronic device in response to said third CTRL-D command providing a third ECM identification code to said waveform controller oscillator wherein said first ECM identification code, said second ECM identification code and said third ECM identification code identify for said operating system computer program which one of a plurality of interchangeable electronic countermeasure modules comprise said first electronic device, said second electronic device and said third electronic device which are connected to the first, second and third communication ports of said waveform controller oscillator;

(g) fourth detecting means for detecting when a computer terminal is connected to said waveform controller oscillator, said operating system software program transferring control of said waveform controller oscillator to said computer terminal whenever said computer terminal is connected to said waveform controller oscillator;

(h) monitoring means for monitoring ECM commands generated by an aircraft cockpit control console whenever said fourth detecting means fails to detect said computer terminal connected to said waveform controller oscillator;

(i) inactivation means for placing said waveform controller oscillator, said first electronic device, said second electronic device and said third electronic device in a standby mode of operation whenever a change occurs in the ECM commands monitored by said monitoring means; and (j) activation means for configuring said waveform controller oscillator, said first electronic device, said second electronic device and said third electronic device to operate in one of a plurality of ECM modes in response to the change occurring in the ECM commands monitored by said monitoring means.

2. The operating system computer program of claim 1 wherein said first electronic device and said second electronic device are each selected from the group consisting of an instantaneous frequency measurement device, a G/I band memory modulator, an E/F band memory modulator, a target generator and a multiple target deception amplifier.

3. The operating system computer program of claim 1 wherein said third electronic device is selected from the group consisting of an instantaneous frequency measurement device, a G/I band memory modulator, an E/F band memory modulator, a target generator, a multiple target deception amplifier, an E/F-band variable polarization attenuator control device and a B-band variable polarization attenuator control device.

4. The operating system computer program of claim 1 wherein said plurality of ECM modes have a frequency range of 1 to 18 GHz.

5. The operating system computer program of claim 4 said ECM modes provide noise, and false information about range, angle and velocity of an aircraft having said waveform controller oscillator mounted within said aircraft, said noise and said false information deceiving a weapons system tracking said aircraft to sense a false location for said aircraft to prevent damage to and destruction of said aircraft during flight.

6. The operating system computer program of claim 1 wherein said computer terminal includes:

(a) a keyboard connected to said waveform controller oscillator;

(b) a monitor connected to said waveform controller oscillator;

(c) said keyboard allowing a user to reprogram said ECM modes for said waveform controller oscillator, said first electronic device, said second electronic device and said third electronic device; and (d) said monitor allowing said user to visualize a reprogramming of said ECM modes for said waveform controller oscillator, said first electronic device, said second electronic device and said third electronic device.

7. The operating system computer program of claim 6 wherein said user enters a password to reprogram said ECM modes for said waveform controller oscillator, said first electronic device, said second electronic device and said third electronic device, said operating system computer program allowing said user to reprogram said ECM modes when said password said user enters is verified by said operating system computer program.

8. The operating system computer program of claim 6 wherein said operating systems computer program includes means for allowing said user to write to each of a plurality of memory addresses for a memory within said waveform controller oscillator and means for allowing said user to read from each of said plurality of memory addresses for a memory within said waveform controller oscillator.

9. An operating system computer program for operating a waveform controller oscillator for an electronic countermeasure set, said waveform controller oscillator having first, second and third communications ports, said operating system computer program comprising:

(a) first detecting means for detecting when a first electronic device is connected to the first communications port for said waveform controller oscillator;

(b) second detecting means for detecting when a second electronic device is connected to the second communications port for said waveform controller oscillator;

(c) third detecting means for detecting when a third electronic device is connected to the third communications port for said waveform controller oscillator;

(d) first electronic countermeasure (ECM) identification means for providing a first CTRL-D command to said first electronic device, said first electronic device in response to said first CTRL-D command providing a first ECM identification code to said waveform controller oscillator;

(e) second ECM identification means for providing a second CTRL-D command to said second electronic device, said second electronic device in response to said second CTRL-D command providing a second ECM identification code to said waveform controller oscillator;

(f) third ECM identification means for providing a third CTRL-D command to said third electronic device, said third electronic device in response to said third CTRL-D command providing a third ECM identification code to said waveform controller oscillator wherein said first ECM identification code, said second ECM identification code and said third ECM identification code identify for said operating system computer program which one of a plurality of interchangeable electronic countermeasure modules comprise said first electronic device, said second electronic device and said third electronic device which are connected to the first, second and third communication ports of said waveform controller oscillator;

(g) fourth detecting means for detecting when a computer terminal is connected to said waveform controller oscillator, said operating system software program transferring control of said waveform controller oscillator to said computer terminal whenever said computer terminal is connected to said waveform controller oscillator;

(h) monitoring means for monitoring ECM commands generated by a cockpit control console for an aircraft whenever said fourth detecting means fails to detect said computer terminal connected to said waveform controller oscillator;

(i) inactivation means for placing said waveform controller oscillator, said first electronic device, said second electronic device and said third electronic device in a standby mode of operation whenever a change occurs in the ECM commands monitored by said monitoring means; and (j) activation means for configuring said waveform controller oscillator, said first electronic device, said second electronic device and,said third electronic device to operate in a selected ECM mode of a plurality of ECM modes generated by said electronic countermeasure set, in response to the change occurring in the ECM commands monitored by said monitoring means; and (k) means for modulating an RF signal received by a receiving antenna connected to said waveform controller oscillator to provide a modulated RF signal, said modulated RF signal including an ECM component representative of the selected ECM mode currently being generated by said electronic countermeasure set, said modulated RF signal being transmitted by a transmitting antenna to a weapons system tracking said aircraft to deceive said weapons system tracking said aircraft; and (l) wherein said ECM modes provide noise, and false information about range, angle and velocity of said aircraft having said waveform controller oscillator mounted within said aircraft, said noise and said false information deceiving said weapons system tracking said aircraft to sense a false location for said aircraft to prevent damage to and destruction of said aircraft during flight.

10. The operating system computer program of claim 9 wherein said first electronic device and said second electronic device are each selected from the group consisting of an instantaneous frequency measurement device, a G/I band memory modulator, an E/F band memory modulator, a target generator and a multiple target deception amplifier.

11. The operating system computer program of claim 9 wherein said third electronic device is selected from the group consisting of an instantaneous frequency measurement device, a G/I band memory modulator, an E/F band memory modulator, a target modulator, a multiple target deception amplifier, an E/F-band variable polarization attenuator control device and a B-band variable polarization attenuator control device.

12. The operating system computer program of claim 9 wherein said plurality of ECM modes have a frequency range of 1 to 18 GHz.

13. The operating system computer program of claim 9 wherein said computer terminal includes:

(a) a keyboard connected to said waveform controller oscillator;

(b) a monitor connected to said waveform controller oscillator;

(c) said keyboard allowing a user to reprogram said ECM modes for said electronic countermeasure set; and (d) said monitor allowing said user to visualize a reprogramming of ECM modes for said electronic countermeasure set.

14. The operating system computer program of claim 9 wherein said user enters a password to reprogram said ECM modes for said electronic countermeasure set, said operating system computer program allowing said user to reprogram said ECM modes when said password said user enters is verified by said operating system computer program.

15. The operating system computer program of claim 9 wherein said operating systems computer program includes means for allowing said user to write to each of a plurality of memory addresses for a memory within said waveform controller oscillator and means for allowing said user to read from each of said plurality of memory addresses for a memory within said waveform controller oscillator.

16. An operating system computer program for operating a waveform controller oscillator for an electronic countermeasure set, said waveform controller oscillator having first, second and third communications ports, said operating system computer program comprising:

(a) first detecting means for detecting when a first electronic device is connected to the first communications port for said waveform controller oscillator;

(b) second detecting means for detecting when a second electronic device is connected to the second communications port for said waveform controller oscillator;

(c) third detecting means for detecting when a third electronic device is connected to the third communications port for said waveform controller oscillator;

(d) first electronic countermeasure (ECM) identification means for providing a first CTRL-D command to said first electronic device, said first electronic device in response to said first CTRL-D command providing a first ECM identification code to said waveform controller oscillator;

(e) second ECM identification means for providing a second CTRL-D command to said second electronic device, said second electronic device in response to said second CTRL-D command providing a second ECM identification code to said waveform controller oscillator;

(f) third ECM identification means for providing a third CTRL-D command to said third electronic device, said third electronic device in response to said third CTRL-D command providing a third ECM identification code to said waveform controller oscillator wherein said first ECM identification code, said second ECM identification code and said third ECM identification code identify for said operating system computer program which one of a plurality of interchangeable electronic countermeasure modules comprise said first electronic device, said second electronic device and said third electronic device which are connected to the first, second and third communication ports of said waveform controller oscillator;

(g) fourth detecting means for detecting when a computer terminal is connected to said waveform controller oscillator, said operating system software program transferring control of said waveform controller oscillator to said computer terminal whenever said computer terminal is connected to said waveform controller oscillator;

(h) monitoring means for monitoring ECM commands generated by a cockpit control console for an aircraft whenever said fourth detecting means fails to detect said computer terminal connected to said waveform controller oscillator;

(i) inactivation means for placing said waveform controller oscillator, said first electronic device, said second electronic device and said third electronic device in a standby mode of operation whenever a change occurs in the ECM commands monitored by said monitoring means; and (j) activation means for configuring said waveform controller oscillator, said first electronic device, said second electronic device and said third electronic device to operate in a selected ECM mode of a plurality of ECM modes generated by said electronic countermeasure set, in response to the change occurring in the ECM commands monitored by said monitoring means; and (k) means for modulating an RF signal received by a receiving antenna connected to said waveform controller oscillator to provide a modulated RF signal, said modulated RF signal including an ECM component representative of the selected ECM mode currently being generated by said electronic countermeasure set, said modulated RF signal being transmitted by a transmitting antenna to a weapons system tracking said aircraft to deceive said weapons system tracking said aircraft; and (l) wherein said ECM modes provide noise, and false information about range, angle and velocity of said aircraft having said waveform controller oscillator mounted within said aircraft, said noise and said false information deceiving said weapons system tracking said aircraft to sense a false location for said aircraft to prevent damage to and destruction of said aircraft during flight;

(m) means for calibrating a plurality of operational parameters of said electronic countermeasure set whenever said computer terminal which includes a keyboard is connected to said waveform controller oscillator, each of said plurality of operational parameters having a calibration command associated therewith wherein said keyboard is used to enter said calibration command for each of said plurality of operational parameters of said electronic countermeasure set.

17. The operating system computer program of claim 16 wherein said plurality of operational parameters to be calibrated for said electronic countermeasure set includes calibrating an amplitude modulation frequency for multiple jammer types for said electronic countermeasure set.

18. The operating system computer program of claim 16 wherein said plurality of operational parameters to be calibrated for said electronic countermeasure set includes calibrating a noise bandwidth, an RF center frequency and a bandwidth offset for a noise generator within the waveform controller oscillator of said electronic countermeasure set.

19. The operating system computer program of claim 16 wherein said plurality of operational parameters to be calibrated for said electronic countermeasure set includes calibrating a 20 dB attenuation for multiple jammer types for said electronic countermeasure set.

20. The operating system computer program of claim 16 wherein said first electronic device and said second electronic device are each selected from the group consisting of an instantaneous frequency measurement device, a G/I band memory modulator, an E/F band memory modulator, a target generator and a multiple target deception amplifier.

21. The operating system computer program of claim 16 wherein said third electronic device is selected from the group consisting of an instantaneous frequency measurement device, a G/I band memory modulator, an E/F band memory modulator, a target generator, a multiple target deception amplifier, an E/F-band variable polarization attenuator control device and a B-band variable polarization attenuator control device.

* * * * *